United States Patent
Aoki et al.

(10) Patent No.: US 10,180,098 B2
(45) Date of Patent: Jan. 15, 2019

(54) CONTROL DEVICE OF EXHAUST SENSOR

(71) Applicant: TOYOTA JIDOSHA KABUSHIKI KAISHA, Aichi-ken (JP)

(72) Inventors: Keiichiro Aoki, Shizuoka-ken (JP); Koji Ide, Gotenba (JP); Go Hayashita, Chigasaki (JP)

(73) Assignee: TOYOTA JIDOSHA KABUSHIKI KAISHA, Aichi-Ken (JP)

(\*) Notice: Subject to any disclaimer, the term of this patent is extended or adjusted under 35 U.S.C. 154(b) by 134 days.

(21) Appl. No.: 15/587,390

(22) Filed: May 4, 2017

(65) Prior Publication Data
US 2017/0321588 A1 Nov. 9, 2017

(30) Foreign Application Priority Data

May 9, 2016 (JP) ................................. 2016-094016

(51) Int. Cl.
*F01N 11/00* (2006.01)
*G01M 15/10* (2006.01)

(52) U.S. Cl.
CPC ......... *F01N 11/007* (2013.01); *G01M 15/102* (2013.01); *F01N 2560/02* (2013.01); *F01N 2560/20* (2013.01); *F01N 2900/0602* (2013.01); *F01N 2900/104* (2013.01)

(58) Field of Classification Search
CPC .... G01M 15/04; G01M 15/10; G01M 15/102; G01M 15/104; F01N 11/00; F01N 11/007; F01N 2560/02; F01N 2560/025; F01N 2560/20; F01N 2900/0602

USPC .............. 73/114.01, 114.69, 114.71, 114.73
See application file for complete search history.

(56) References Cited

U.S. PATENT DOCUMENTS

| 2005/0205550 | A1* | 9/2005 | Saito et al. | ......... F02D 41/1494 219/497 |
| 2007/0170057 | A1* | 7/2007 | Kobayashi | ......... G01N 27/4071 204/424 |
| 2009/0116534 | A1 | 5/2009 | Tabery et al. | |
| 2017/0292433 | A1* | 10/2017 | Hayashita | ............. F01N 11/007 |
| 2017/0356323 | A1* | 12/2017 | Hayashita | ............... F01N 11/00 |

(Continued)

FOREIGN PATENT DOCUMENTS

| JP | 60-6038 A | 1/1985 |
| JP | 2007-41006 A | 2/2007 |

(Continued)

*Primary Examiner* — Benjamin R Schmitt
(74) *Attorney, Agent, or Firm* — Hauptman Ham, LLP

(57) ABSTRACT

A control device of an exhaust sensor comprises a battery voltage detection part detecting a voltage of a battery, and a heater control part setting a target temperature of an electrochemical cell and controlling the electric power supplied from the battery to a heater. The heater control part sets the target temperature to a first temperature after startup of the internal combustion engine until the voltage of the battery recovers to a predetermined voltage, and switches the target temperature from the first temperature to a second temperature when the voltage of the battery recovers to the predetermined voltage. The first temperature is a temperature lower than an operating temperature of the electrochemical cell and at least a lowest temperature at which a Leidenfrost phenomenon occurs at the protective layer. The second temperature is a temperature of the operating temperature or more.

12 Claims, 14 Drawing Sheets

(56) References Cited

U.S. PATENT DOCUMENTS

| | | | | |
|---|---|---|---|---|
| 2017/0356378 A1* | 12/2017 | Hayashita | ............ | G01N 27/4067 |
| 2017/0356392 A1* | 12/2017 | Hayashita | ............ | F02D 41/1494 |
| 2018/0209364 A1* | 7/2018 | Ono | ...................... | B60W 20/15 |

FOREIGN PATENT DOCUMENTS

| | | |
|---|---|---|
| JP | 2009-529691 A | 8/2009 |
| JP | 2012-93330 A | 5/2012 |

* cited by examiner

FIG. 1
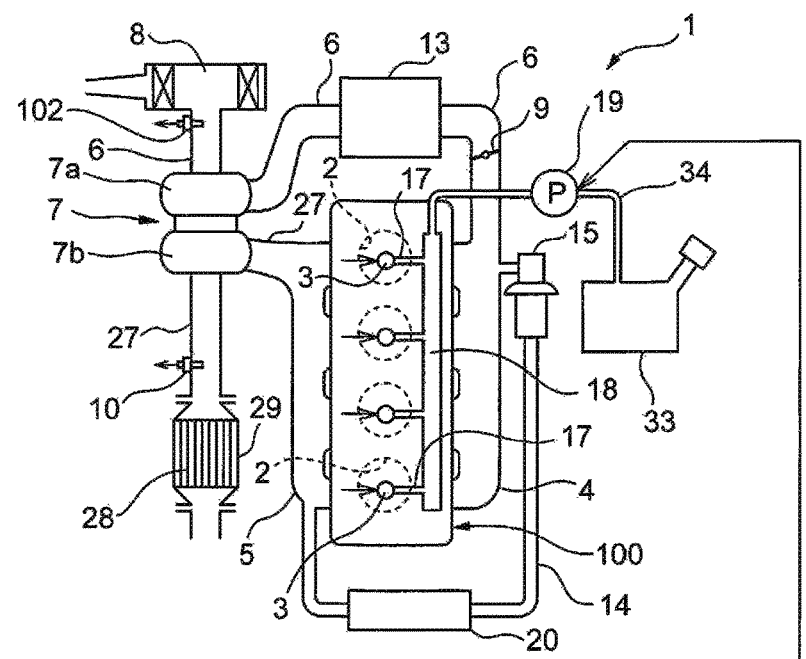
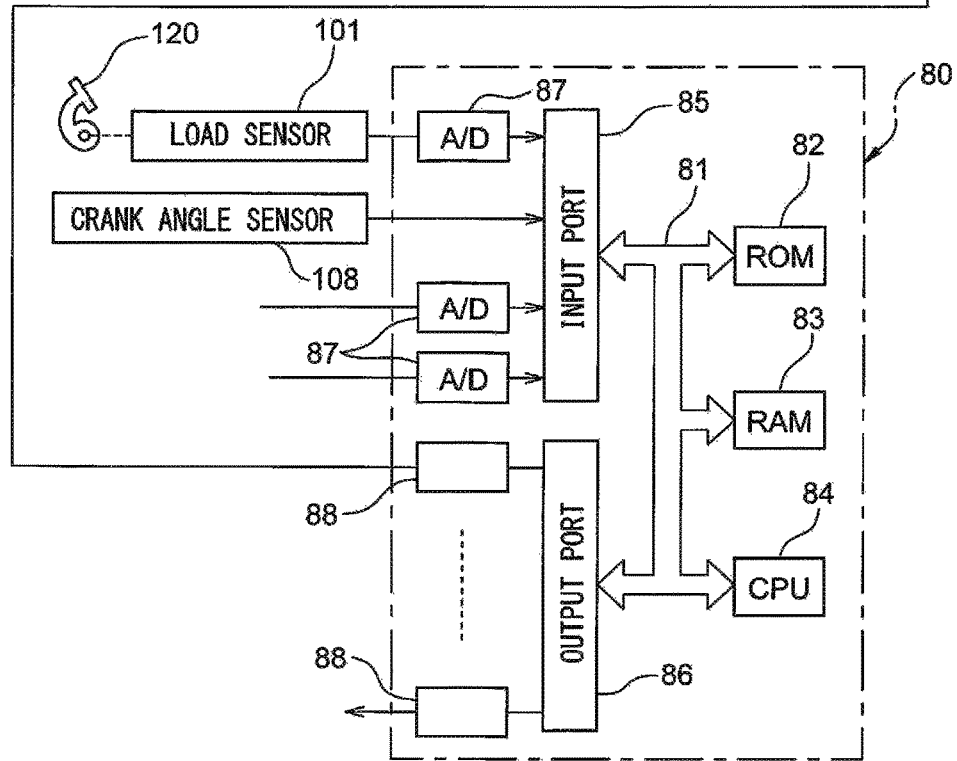

CONTROL DEVICE OF EXHAUST SENSOR

RELATED APPLICATIONS

The present application claims priority to Japanese Patent Application No. 2016-094016 filed May 9, 2016, the disclosures of which is hereby incorporated by reference herein in its entirety.

TECHNICAL FIELD

The present invention relates to a control device of an exhaust sensor.

BACKGROUND ART

It has been known in the past to arrange an exhaust sensor in an exhaust passage of an internal combustion engine to detect a specific component in the exhaust gas (for example, see PLTs 1 to 4). The exhaust sensor described in PLTs 1 and 2 is provided with an element body provided with an electrochemical cell, and a protective layer formed on the outer surface of the element body and comprised of a porous ceramic. The exhaust sensor is fastened to an exhaust pipe so as to be exposed to exhaust gas. Part of the exhaust gas passes through the protective layer and flows to the inside of the element body. Further, the exhaust sensor is provided with a heater for heating the element body so that the electrochemical cell becomes a predetermined operating temperature or more.

In this regard, when the temperature of the exhaust pipe is the dew point temperature of water or less, the water vapor in the exhaust gas condenses and condensed water is generated. If there is condensed water in the exhaust passage, drops of the condensed water strike the protective layer of the exhaust sensor together with the exhaust gas. If the protective layer does not have water repellency, the drops of water striking the protective layer will penetrate to the inside of the protective layer. If the temperature of the protective layer is high due to heating by the heater, the drops of water penetrating the protective layer will evaporate inside the protective layer. As a result, thermal shock will be given to the protective layer and element body and the element will sometimes crack.

Therefore, PLTs 1 and 2 describe preventing cracking of the element of the exhaust sensor by utilizing the Leidenfrost phenomenon to give the protective layer of the exhaust sensor water repellency. The "Leidenfrost phenomenon" is the phenomenon where when drops of water strike a high temperature protective layer, a film of water vapor is formed between the protective layer and drops of water whereby transfer of heat between the protective layer and the drops of water is suppressed. If the Leidenfrost phenomenon occurs, the drops of water are repelled from the protective layer, so water is kept from penetrating the protective layer.

In the invention described in PLT 1, at the time of startup of the internal combustion engine, to use the Leidenfrost phenomenon to prevent cracking of the element, the temperature of the sensor surface is held at a shock resistance temperature higher than the operating temperature until the temperature around the exhaust sensor reaches the dew point temperature. After that, if the temperature around the exhaust sensor reaches the dew point temperature, the temperature of the sensor surface is made to fall from the shock resistance temperature to the operating temperature.

CITATION LIST

Patent Literature

PLT 1: Japanese Patent Publication No. 2009-529691A
PLT 2: Japanese Patent Publication No. 2012-093330A
PLT 3: Japanese Patent Publication No. 60-006038A
PLT 4: Japanese Patent Publication No. 2007-041006A

SUMMARY OF INVENTION

Technical Problem

In this regard, when, after startup of the internal combustion engine, the heater is used to heat the element body and protective layer, the heater of the exhaust sensor is supplied with electrical power from the battery of the vehicle mounting the internal combustion engine. However, at the time of startup of the internal combustion engine, due to cranking of the internal combustion engine, the load of the battery increases and the voltage of the battery temporarily falls. If heating the element body and protective layer of the exhaust sensor by increasing the power consumption of the heater at the time of a fall in the battery voltage, recovery of the battery voltage will be delayed and there will be a detrimental effect on control of the fuel injection amount etc.

Therefore, an object of the present invention is to provide a control device of an exhaust sensor able to suppress an increase in the power consumption of a heater while preventing cracking of an element of the exhaust sensor due to coverage by water.

Solution to Problem

In order to solve the above problem, in a first aspect, there is provided a control device of an exhaust sensor controlling an exhaust sensor arranged in an exhaust passage in an internal combustion engine and detecting a specific component in exhaust gas, wherein the exhaust sensor comprises an element body provided with an electrochemical cell, a protective layer formed on an outer surface of the element body and comprised of a porous ceramic, and a heater supplied with electric power from a battery and heating the element body and the protective layer, the control device comprises a battery voltage detection part configured to detect a voltage of the battery, and a heater control part configured to set a target temperature of the electrochemical cell and control the electric power supplied from the battery to the heater so that the temperature of the electrochemical cell becomes the target temperature, and the heater control part is configured to set the target temperature to a first temperature after startup of the internal combustion engine until the voltage of the battery detected by the battery voltage detection part recovers to a predetermined voltage, and switch the target temperature from the first temperature to a second temperature when the voltage of the battery detected by the battery voltage detection part recovers to the predetermined voltage, the first temperature being a temperature lower than an operating temperature of the electrochemical cell and at least a lowest temperature at which a Leidenfrost phenomenon occurs at an outer surface of the protective layer, and the second temperature being a temperature of the operating temperature or more.

In a second aspect, the heater control part is configured to supply the heater with electric power smaller than an electric power supplied to the heater when the target temperature is set to the first temperature, after startup of the internal combustion engine and before setting the target temperature to the first temperature, in the first aspect.

In a third aspect, the heater control part is configured to set the target temperature to a third temperature after startup of the internal combustion engine and before setting the target temperature to the first temperature, the third temperature being a temperature of a boiling point of water to less than the first temperature, in the second aspect.

In a forth aspect, the exhaust sensor includes an upstream side exhaust sensor arranged at an upstream most side in a direction of flow of exhaust gas and a downstream side exhaust sensor arranged at a downstream side of the upstream side exhaust sensor in the direction of flow of exhaust gas, and the heater control part is configured to set the target temperature at the upstream side exhaust sensor to the first temperature and set the target temperature at the downstream side exhaust sensor to a temperature of less than the lowest temperature or stop the supply of power to the heater of the downstream side exhaust sensor after startup of the internal combustion engine until the voltage of the battery detected by the battery voltage detection part recovers to the predetermined voltage, in any one of the first to third aspects.

In a fifth aspect, the control device further comprises a temperature estimation part configured to estimate a temperature of an exhaust pipe around the exhaust sensor, and the heater control part is configured to switch the target temperature from the second temperature to a fourth temperature when the temperature of the exhaust pipe estimated by the temperature estimation part reaches a temperature of the boiling point of water or more after the voltage of the battery detected by the battery voltage detection part recovers to the predetermined voltage, the second temperature being a temperature higher than the operating temperature, the fourth temperature being the operating temperature, in any one of the first to fourth aspects.

Advantageous Effects of Invention

According to the present invention, there is provided a control device of an exhaust sensor able to suppress an increase in the power consumption of a heater while preventing cracking of an element of the exhaust sensor due to coverage by water.

BRIEF DESCRIPTION OF DRAWINGS

FIG. 1 is a view schematically showing an internal combustion engine in which a control device of an exhaust sensor according to a first embodiment of the present invention is used.

DESCRIPTION OF EMBODIMENTS

Figure 2:
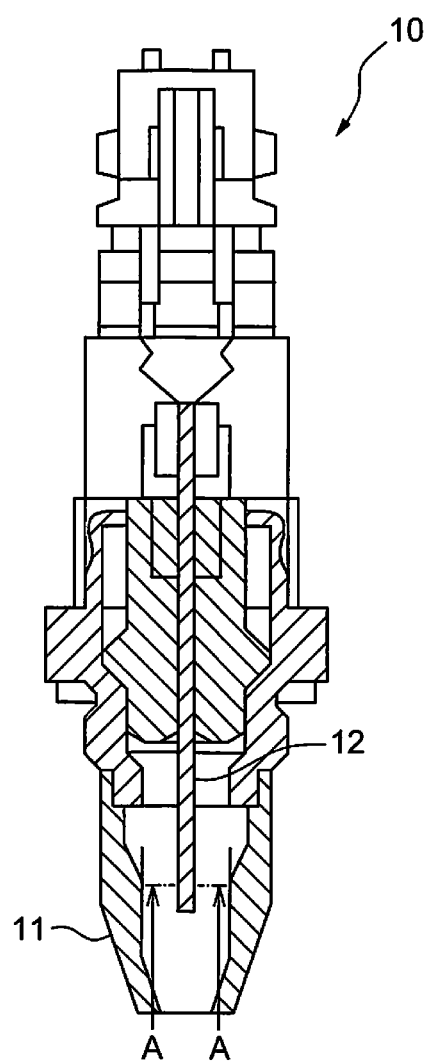
FIG. 2 is an enlarged view of an air-fuel ratio sensor.

Below, referring to the drawings, embodiments of the present invention will be explained in detail. Note that, in the following explanation, similar components will be assigned the same reference notations.

First Embodiment

First, referring to FIG. 1 to FIG. 7, a first embodiment of the present invention will be explained.

<Explanation of Internal Combustion Engine as Whole>

FIG. 1 is a view schematically showing an internal combustion engine 1 in which a control device of an exhaust sensor according to the first embodiment of the present invention is used. The internal combustion engine 1 shown in FIG. 1 is a compression ignition type internal combustion engine (diesel engine). The internal combustion engine 1 is for example mounted in a vehicle.

Referring to FIG. 1, the internal combustion engine 1 is provided with an engine body 100, a combustion chamber 2 of each cylinder, an electronically controlled fuel injector 3 injecting fuel into each combustion chamber 2, an intake manifold 4, and an exhaust manifold 5. The intake manifold 4 is connected through an intake pipe 6 to an outlet of a compressor 7a of a turbocharger 7. The inlet of the compressor 7a is connected through the intake pipe 6 to an air cleaner 8. Inside the intake pipe 6, a throttle valve 9 driven by a step motor is arranged. Furthermore, around the intake pipe 6, a cooling device 13 for cooling the intake air flowing through the inside of the intake pipe 6 is arranged. In the internal combustion engine 1 shown in FIG. 1, engine cooling water is guided to the inside of the cooling device 13 and cools the intake air. The intake manifold 4 and intake pipe 6 form an intake passage guiding air to the inside of each combustion chamber 2.

On the other hand, the exhaust manifold 5 is connected through an exhaust pipe 27 to an inlet of a turbine 7b of the turbocharger 7. The outlet of the turbine 7b is connected through the exhaust pipe 27 to a casing 29 housing an exhaust purification catalyst 28. The exhaust manifold 5 and exhaust pipe 27 form an exhaust passage discharging exhaust gas generated by combustion of the air-fuel mixture in each combustion chamber 2. The exhaust purification catalyst 28 is, for example, a selective catalytic reduction type $NO_X$ reduction catalyst (SCR catalyst) or an $NO_X$ storage and reduction catalyst for removing the $NO_X$ in the exhaust gas by reduction. Further, inside the exhaust passage, to reduce particulate matter (PM) in the exhaust gas, an oxidation catalyst, diesel particulate filter (DPF), etc. may be arranged.

The exhaust manifold 5 and the intake manifold 4 are connected through an exhaust gas recirculation (below, referred to as "EGR") passage 14. Inside the EGR passage 14, an electronically controlled EGR control valve 15 is arranged. Further, around the EGR passage 14, an EGR cooling device 20 is arranged for cooling the EGR gas flowing through the inside of the EGR passage 14. In the embodiment shown in FIG. 1, the engine cooling water is guided to the inside of the EGR cooling device 20 and cools the EGR gas.

The fuel is supplied by an electronically controlled variable discharge fuel pump 19 from a fuel tank 33 through a fuel pipe 34 to the inside of a common rail 18. The fuel supplied to the inside of the common rail 18 is supplied through the individual fuel supply pipes 17 to the individual fuel injectors 3.

The various control routines of the internal combustion engine 1 are performed by the electronic control unit (ECU) 80. The ECU 80 is comprised of a digital computer provided with components connected to each other through a bidirectional bus 81 such as a ROM (read only memory) 82, RAM (random access memory) 83, CPU (microprocessor) 84, input port 85, and output port 86. Outputs of a load sensor 101 and an air-flow meter 102 are input through corresponding AD converters 87 to the input port 85. On the other hand, the output port 86 is connected through corresponding drive circuits 88 to the fuel injectors 3, throttle valve drive step motor, EGR control valve 15, and fuel pump 19.

The load sensor 101 generates an output voltage proportional to an amount of depression of an accelerator pedal 120. Therefore, the load sensor 101 detects the engine load. The air-flow meter 102 is arranged inside the intake passage between the air cleaner 8 and compressor 7a and detects the amount of air flowing through the inside of the intake pipe 6. Furthermore, a crank angle sensor 108 generating an output pulse every time the crankshaft rotates by for example 15° is connected to the input port 85. The crank angle sensor 108 5 s used to detect the engine speed.

Note that, the internal combustion engine 1 may be a spark ignition type internal combustion engine with spark plugs arranged in the combustion chambers. Further, specific configurations of the internal combustion engine 1 such as the cylinder array, configuration of the intake and exhaust systems, and presence or absence of a turbocharger may differ from the configuration shown in FIG. 1.

<Explanation of Air-Fuel Ratio Sensor>

In the present embodiment, as the exhaust sensor controlled by the control device of an exhaust sensor, an air-fuel ratio sensor 10 is arranged at the exhaust passage of the internal combustion engine 1. The air-fuel ratio sensor 10 detects a specific component in the exhaust gas flowing through the exhaust passage of the internal combustion engine 1. Specifically, the air-fuel ratio sensor 10 detects the concentration of oxygen in the exhaust gas to thereby linearly detect the air-fuel ratio of the exhaust gas.

In the present embodiment, the air-fuel ratio sensor 10 is arranged in the exhaust passage at the upstream side of the exhaust purification catalyst 28 in the direction of flow of exhaust gas. Note that, the air-fuel ratio sensor 10 may be arranged at another position in the exhaust passage, for example, at the downstream side of the exhaust purification catalyst 28 in the direction of flow of exhaust gas.

Below, referring to FIG. 2 and FIG. 3, the configuration of the air-fuel ratio sensor 10 will be explained. FIG. 2 is an enlarged view of the air-fuel ratio sensor 10. In FIG. 2, the front end side of the air-fuel ratio sensor 10 is shown by a cross-sectional view. The air-fuel ratio sensor 10 is fastened to the exhaust pipe 27 in the state with the front end part 11 inserted inside the exhaust pipe 27. The air-fuel ratio sensor 10 is provided with a sensor element 12 having a plate-like shape at its inside.

Figure 3:
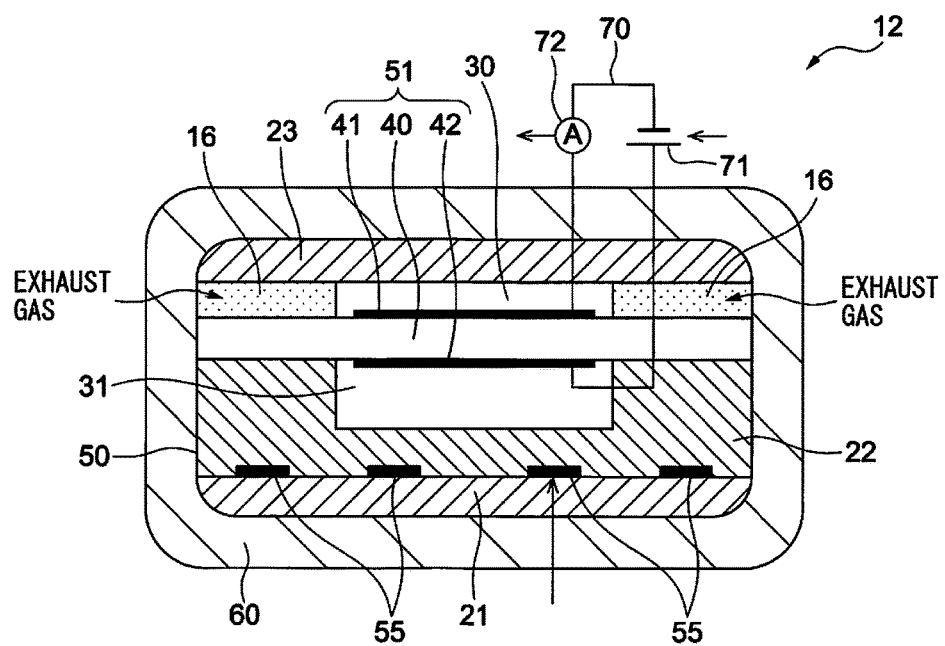
FIG. 3 is a cross-sectional view of a sensor element of an air-fuel ratio sensor along the line A-A of FIG. 2.

FIG. 3 is a cross-sectional view of a sensor element 12 of the air-fuel ratio sensor 10 along the line A-A of FIG. 2. As shown in FIG. 3, the sensor element 12 of the air-fuel ratio sensor 10 is provided with an element body 50 provided with a sensor cell 51 and a protective layer 60 formed on the outer surface of the element body 50.

The element body 50 is provided with a measured gas chamber 30 and a reference gas chamber 31. When the air-fuel ratio sensor 10 is arranged in the exhaust passage of the internal combustion engine 1, exhaust gas flowing through the exhaust passage is introduced into the measured gas chamber 30 as the measured gas. Reference gas is introduced into the reference gas chamber 31. The reference gas is for example the atmosphere. In this case, the reference gas chamber 31 is opened to the atmosphere.

The air-fuel ratio sensor 10 is a laminate type air-fuel ratio sensor comprised of a plurality of layers laminated together. The element body 50 is provided with a solid electrolyte layer 40, diffusion regulating layer 16, first barrier layer 21, second barrier layer 22, and third barrier layer 23. The solid electrolyte layer 40 is a thin plate member having oxide ion conductivity. The solid electrolyte layer 40 is, for example, a sintered body of $ZrO_2$ (zirconia), $HfO_2$, $ThO_2$, $Bi_2O_3$, etc. to which CaO, MgO, $Y_2O_3$, $Yb_2O_3$, etc. is added as a stabilizer. The diffusion regulating layer 16 is a thin plate member having gas permeability. The diffusion regulating layer 16 is, for example, comprised of alumina, magnesia, silica, spinel, mullite, or other porous ceramic. The barrier layers 21 to 23 are gas barrier type thin sheet members, and, for example, include alumina.

The layers of the element body 50 are comprised of, from the bottom of FIG. 3, the first barrier layer 21, second barrier layer 22, solid electrolyte layer 40, diffusion regulating layer 16, and third barrier layer 23 stacked in that order. The measured gas chamber 30 is formed and defined by the solid electrolyte layer 40, diffusion regulating layer 16, and third barrier layer 23. The exhaust gas passes through the protective layer 60 and diffusion regulating layer 16 and is introduced to the inside of the measured gas chamber 30. The diffusion regulating layer 16 regulates the diffusion of the measured gas. Note that, the measured gas chamber 30 may be configured in any form so long as adjoining the solid electrolyte layer 40 and having the measured gas introduced into it.

The reference gas chamber 31 is formed and defined by the solid electrolyte layer 40 and the second barrier layer 22. Note that, the reference gas chamber 31 may be configured in any form so long as adjoining the solid electrolyte layer 40 and having the reference gas flow into it.

The sensor cell 51 is an electrochemical cell having a solid electrolyte layer 40, first electrode 41, and second electrode 42. The first electrode 41 is arranged on the surface of the solid electrolyte layer 40 on the measured gas chamber 30 side so that it is exposed to the measured gas of the measured gas chamber 30. On the other hand, the second electrode 42 is arranged on the surface of the solid electrolyte layer 40 on the reference gas chamber 31 side so that it is exposed to the reference gas inside the reference gas chamber 31. The first electrode 41 and the second electrode 42 are arranged so as to face each other across the solid electrolyte layer 40. The first electrode 41 and second electrode 42 are comprised of platinum (Pt) or another precious metal with a high catalytic activity. For example, the first electrode 41 and second electrode 42 are porous cermet electrodes including mainly Pt.

The protective layer 60 is formed on the outer surface of the element body 50 so as to cover the entire outer surface of the element body 50. The protective layer 60 has a gas permeability and is comprised of alumina, titania, zirconia, silicon carbide, silicon nitride, zinc oxide, and other porous ceramic.

The sensor element 12 is further provided with a heater 55. In the present embodiment, the heater 55, as shown in FIG. 3, is arranged between the first barrier layer 21 and the second barrier layer 22. The heater 55 is, for example, a thin plate member of cermet including platinum (Pt) and ceramic (for example, alumina etc.) and forms a heat generating element generating heat by conduction of current. The heater 55 heats the element body 50 and protective layer 60.

The first electrode 41 and second electrode 42 of the sensor cell 51 are connected to an electrical circuit 70. The electrical circuit 70 is provided with a power supply 71 and current detector 72. The power supply 71 applies voltage across the electrodes so that the potential of the second electrode 42 becomes higher than the potential of the first electrode 41. The output port 86 of the ECU 80 is connected through a corresponding drive circuit 88 to the power supply 71. Therefore, the ECU 80 can control the power supply 71 and control the voltage applied to the sensor cell 51. Further, the current detector 72 detects the current flowing through the sensor cell 51 as the output of the sensor cell 51. The output of the current detector 72 is input through the corresponding AD converter 87 to the input port 85 of the ECU 80. Therefore, the ECU 80 can acquire the output of the sensor cell 51 detected by the current detector 72 from the current detector 72.

The air-fuel ratio sensor 10 detects the limit current flowing through the sensor cell 51 when applying predetermined voltage to the sensor cell 51 so as to detect the air-fuel ratio of the exhaust gas. Therefore, the air-fuel ratio sensor 10 in the present embodiment is a so-called limit current type air-fuel ratio sensor.

<Leidenfrost Phenomenon>

In this regard, when the temperature of the exhaust pipe is the dew point temperature of water or less, the water vapor in the exhaust gas condenses and condensed water is formed. If there is condensed water in the exhaust passage, the drops of the condensed water strike the protective layer 60 of the air-fuel ratio sensor 10 together with the exhaust gas. When the protective layer 60 does not have water repellency, the drops of water striking the protective layer 60 penetrate to the inside of the protective layer 60. When due to heating by the heater 55, the temperature of the protective layer 60 is high, the drops of water penetrating to the protective layer 60 evaporate inside the protective layer 60. As a result, the protective layer 60 and element body 50 are given thermal shock and sometimes the sensor element 12 cracks.

The protective layer 60 has water repellency when the temperature is high. This property is obtained by causing the Leidenfrost phenomenon. The "Leidenfrost phenomenon" is the phenomenon where when drops of water strike a high temperature protective layer 60, a film of water vapor is formed between the protective layer 60 and drops of water whereby transfer of heat between the protective layer 60 and the drops of water is suppressed. If the Leidenfrost phenomenon occurs, the drops of water are repelled from the protective layer 60, so water is kept from penetrating the protective layer 60.

The temperature at which the Leidenfrost phenomenon occurs is generally said to be determined by the type of liquid which strikes an object. However, the inventors of the present application newly discovered that in an object with small thermal capacity like the protective layer 60 of the air-fuel ratio sensor 10, the temperature at which the Leidenfrost phenomenon occurs changes in accordance with the amount of the liquid.

Figure 4:
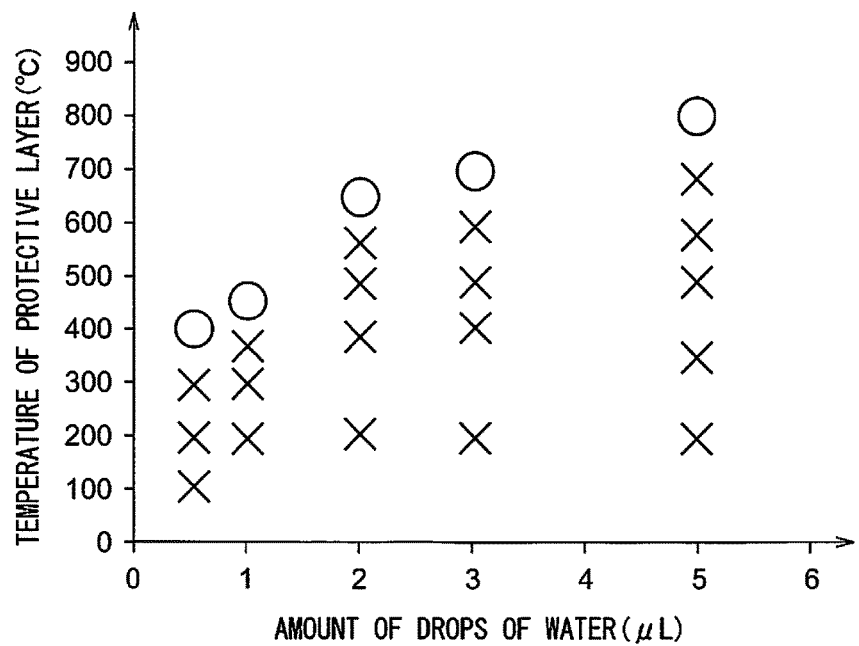
FIG. 4 is a graph showing the occurrence of the Leidenfrost phenomenon when the amount of drops of water striking the protective layer and a temperature of a protective layer have been changed.

FIG. 4 is a graph showing any occurrence of the Leidenfrost phenomenon when changing the amount of drops of water striking the protective layer 60 and the temperature of the protective layer 60. The x marks in the figure show when no Leidenfrost phenomenon occurs. On the other hand, the o marks in the figure show when the Leidenfrost phenomenon occurs. As will be understood from FIG. 4, the temperature at which the Leidenfrost phenomenon occurs changes according to the amount of drops of water. Specifically, the temperature at which the Leidenfrost phenomenon occurs becomes higher the greater the amount of drops of water. The reason is believed to be that in the protective layer 60 with its small thermal capacity, at the time of formation of a film of water vapor, the temperature of the protective layer 60 drops and the drop in temperature of the protective layer 60 becomes proportional to the amount of drops of water.

<Problem when Heating Sensor Element at Startup of Internal Combustion Engine>

In this regard, after startup of the internal combustion engine 1 when using the heater 55 to heat the element body 50 and protective layer 60, the heater 55 of the air-fuel ratio sensor 10 is supplied with electric power from the battery of the vehicle mounting the internal combustion engine 1. However, at the time of startup of the internal combustion engine 1, due to cranking of the internal combustion engine 1, the load of the battery increases and the voltage of the battery temporarily falls. If heating the element body 50 and protective layer 60 of the air-fuel ratio sensor 10 by increasing the power consumption of the heater when the battery voltage falls, the recovery of the battery voltage is delayed and the control of the fuel injection amount etc. is detrimentally affected.

For this reason, at the time of startup of the internal combustion engine 1, it is preferable to suppress the increase of the power consumption of the heater 55 while preventing cracking of the element of the air-fuel ratio sensor 10 due to coverage by water.

<Explanation of Control Device of Exhaust Sensor>

Figure 5:
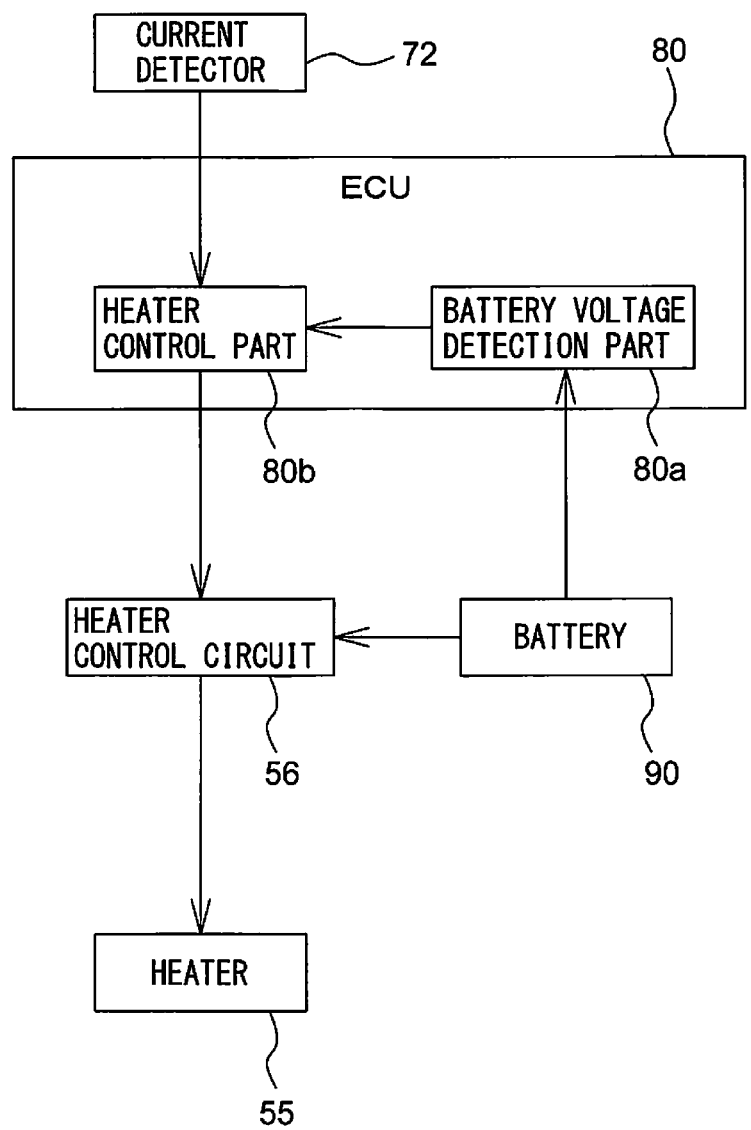
FIG. 5 is a block diagram schematically showing the configuration of a control device of an exhaust sensor etc. according to the first embodiment of the present invention.

Therefore, the control device of an exhaust sensor according to the present embodiment performs the following control when starting up the internal combustion engine 1. FIG. 5 is a block diagram schematically showing the configuration of the control device of an exhaust sensor etc. according to the first embodiment of the present invention. The control device of an exhaust sensor is provided with a battery voltage detection part 80a and heater control part 80b. In the present embodiment, the battery voltage detection part 80a and heater control part 80b are parts of the ECU 80.

The battery voltage detection part 80a detects the voltage of the battery 90. The heater control part 80b controls the heater 55 through a heater control circuit 56 to thereby control the temperature of the sensor element 12 (element body 50 and protective layer 60), in particular the temperature of the sensor cell 51. Specifically, the heater control part 80b sets the target temperature of the sensor cell 51 and controls the electric power supplied from the battery 90 to the heater 55 so that the temperature of the sensor cell 51 becomes the target temperature. For example, the heater control part 80b calculates the temperature of the sensor cell 51 based on the impedance of the sensor cell 51 and controls by feedback the electric power supplied to the heater 55 so that the calculated temperature becomes the target temperature. The impedance of the sensor cell 51 is calculated based on the output of the sensor cell 51 detected by the current detector 72 when a high frequency voltage is applied from the power supply 71 to the sensor cell 51.

If electric power is supplied to the heater 55 by the heater control part 80b from the battery 90 through the heat control circuit 56, the element body 50 and protective layer 60 are heated. At this time, the temperature of the protective layer 60 is correlated with the temperature of the sensor cell 51. Therefore, due to the above-mentioned feedback control, not only the temperature of the sensor cell 51, but also the temperature of the protective layer 60 can be controlled.

As explained above, when the internal combustion engine 1 is started up, due to cranking of the internal combustion engine 1, the load of the battery 90 increases and the voltage of the battery 90 temporarily falls. For this reason, the heater control part 80b suppresses an increase of the power consumption of the heater 55 by setting the target temperature to a first temperature after startup of the internal combustion engine 1 until the voltage of the battery 90 detected by the battery voltage detection part 80a recovers to a predetermined voltage. The predetermined voltage is a voltage of less than the rated voltage of the battery 90 and is, for example, 10.5V.

The first temperature is a temperature lower than the operating temperature of the sensor cell 51 and at least the lowest temperature at which the Leidenfrost phenomenon occurs at the outer surface of the protective layer 60. The operating temperature of the sensor cell 51 is a temperature of the activation temperature of the sensor cell 51 or more, for example, 750° C. The lowest temperature at which the Leidenfrost phenomenon occurs at the outside surface of the protective layer 60 means the lower limit value of the temperature at which the Leidenfrost phenomenon occurs when an extremely small amount of drops of water strikes the protective layer 60, and, for example, is 400° C. The first temperature is made, for example, the lowest temperature at which the Leidenfrost phenomenon occurs, that is, 400° C.

A certain extent of time is taken after startup of the internal combustion engine 1 until the condensed water produced from the exhaust gas reaching the exhaust pipe 27 splatters toward the air-fuel ratio sensor 10. For this reason, right after startup of the internal combustion engine 1, the possibility of the sensor element 12 of the air-fuel ratio sensor 10 cracking due to coverage by water is extremely low. Further, right after startup of the internal combustion engine 1, even if drops of condensed water strike the protective layer 60, the amount of drops of water is guessed to be extremely small. As will be understood from FIG. 4, the lowest temperature at which the Leidenfrost phenomenon occurs becomes lower the smaller the amount of drops of water. For this reason, after startup of the internal combustion engine 1 when the voltage of the battery 90 temporarily falls, even if setting the target temperature of the sensor cell 51 to a temperature less than the operating temperature, it is possible to prevent cracking of the element of the air-fuel ratio sensor 10 due to coverage by water.

Further, the heater control part 80b switches the target temperature from the first temperature to a second temperature when the voltage of the battery 90 detected by the battery voltage detection part 80a recovers to the above predetermined voltage. The second temperature is the temperature of the operating temperature of the sensor cell 51 or more. For example, the second temperature is made the operating temperature of the sensor cell 51 of 750° C. Due to this, even after the amount of splatter of the condensed water becomes greater, it is possible to prevent cracking of the element of the air-fuel ratio sensor 10 due to coverage by water. Therefore, according to the control device of an exhaust air-fuel ratio according to the present embodiment, it is possible to suppress an increase in the power consumption of the heater 55 while preventing cracking of the element of the air-fuel ratio sensor 10 due to coverage by water.

Further, if making the temperature of the sensor element 12 rapidly rise to the first temperature right after starting up the internal combustion engine 1, the water remaining inside the sensor element 12 will violently boil and the sensor element 12 is liable to crack. For this reason, in the present embodiment, the heater control part 80b supplies the heater 55 with electric power smaller than the electric power supplied to the heater 55 when the target temperature is set to the first temperature, after startup of the internal combustion engine 1 and before setting the target temperature of the sensor cell 51 to the first temperature. For example, the heater control part 80b makes the current carrying duty ratio of the heater 55 lower than the current carrying duty ratio when the target temperature is set to the first temperature, for a predetermined time after the startup of the internal combustion engine 1 and before setting the target temperature of the sensor cell 51 to the first temperature. By doing this, it is possible to suppress a rapid rise in temperature of the sensor element 12 and possible to make the water inside the sensor element 12 gradually evaporate. As a result, it is possible to prevent cracking of the element of the air-fuel ratio sensor 10 due to violent boiling.

Note that, the heater control part 80b may set the target temperature of the sensor cell 51 to a third temperature after startup of the internal combustion engine 1 and before setting the target temperature of the sensor cell 51 to the first temperature. The third temperature is a temperature of the boiling point of water to less than the first temperature and, for example, is 120° C. When the target temperature of the sensor cell 51 is set to the third temperature, the electric power supplied to the heater 55 is smaller than the electric power supplied to the heater 44 when the target temperature of the sensor cell 51 is set to the first temperature. By making the target temperature right after startup of the internal combustion engine 1 lower than the first temperature, it is possible to suppress a rapid rise in temperature of the sensor element 12.

<Explanation of Control Using Time Chart>

Figure 6:
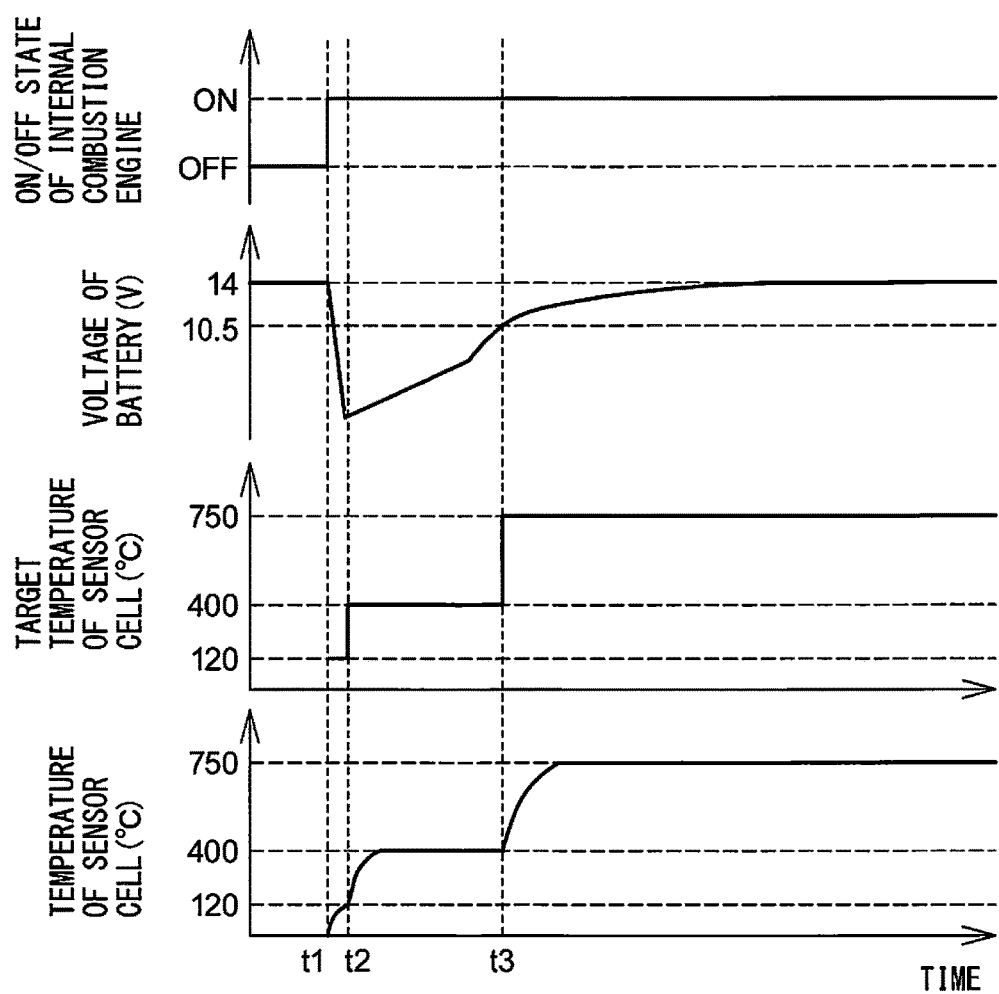
FIG. 6 is a schematic time chart of an on/off state of an internal combustion engine etc. when starting up the internal combustion engine.

Below, referring to the time chart of FIG. 6, control when making the internal combustion engine 1 start up will be specifically explained. FIG. 6 is a schematic time chart of the on/off state of the internal combustion engine 1, voltage of the battery 90, target temperature of the sensor cell 51, and temperature of the sensor cell 51 when making an internal combustion engine 1 start up. In the illustrated example, the temperature of the sensor cell 51 is calculated based on the impedance of the sensor cell 51.

In the illustrated example, at the time t1, the internal combustion engine 1 is started up. If the internal combustion engine 1 is started up, due to cranking of the internal combustion engine 1, the load of the battery 90 increases and the voltage of the battery 90 rapidly falls from 14V. Further, if the internal combustion engine 1 is started up, the target temperature of the sensor cell 51 is set to 120° C. As a result, the temperature of the sensor cell 51 rises toward 120° C.

At the time t2, if the temperature of the sensor cell 51 reaches 120° C., the target temperature of the sensor cell 51 is switched from 120° C. to 400° C. As a result, the temperature of the sensor cell 51 rises toward 400° C. After the temperature of the sensor cell 51 reaches 400° C., the temperature of the sensor cell 51 is maintained at 400° C. until the voltage of the battery 90 recovers.

At the time t3, the voltage of the battery 90 recovers to 10.5V. For this reason, at the time t3, the target temperature of the sensor cell 51 is switched from 400° C. to 750° C. As a result, the temperature of the sensor cell 51 rises toward 750° C. After the temperature of the sensor cell 51 reaches 750° C., the temperature of the sensor cell 51 is maintained at 750° C.

<Processing for Setting Target Temperature>

Figure 7:
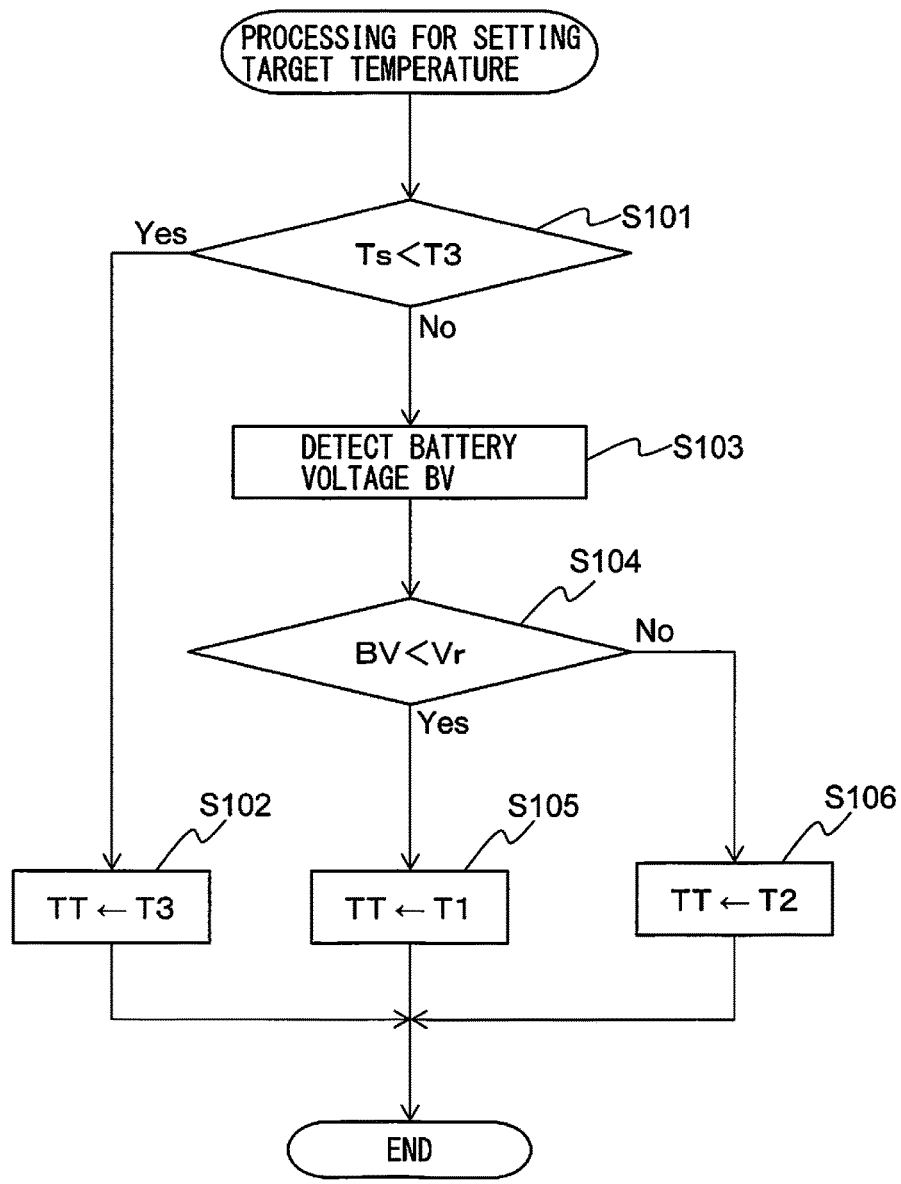
FIG. 7 is a flow chart showing a control routine for processing for setting the target temperature in the first embodiment of the present invention.

Below, referring to the flow chart of FIG. 7, control for setting the target temperature of the sensor cell 51 will be explained. FIG. 7 is a flow chart showing a control routine for processing for setting the target temperature in the first embodiment of the present invention. The present control routine is repeatedly performed after startup of the internal combustion engine 1 by the ECU 80 at predetermined time intervals.

First, at step S101 the heater control part 80b judges whether the temperature Ts of the sensor cell 51 is less than the third temperature T3. The temperature Ts of the sensor cell 51 is calculated based on the impedance of the sensor cell 51. The third temperature T3 is a temperature of the boiling point of water to less than the first temperature T1 and, for example, is 120° C.

When at step S101 it is judged that the temperature Ts of the sensor cell 51 is less than the third temperature T3, the present control routine proceeds to step S102. At step S102, the target temperature TT of the sensor cell 51 is set to the third temperature T3. After step S102, the present control routine is ended.

On the other hand, when at step S101 it is judged that the temperature Ts of the sensor cell 51 is the third temperature T3 or more, the present control routine proceeds to step S103. At step S103, the battery voltage detection part 80a detects the voltage BV of the battery 90.

Next, at step S104, the heater control part 80b judges whether the voltage BV of the battery 90 is less than a predetermined voltage Vr. The predetermined voltage Vr is a voltage of less than the rated voltage of the battery 90 and, for example, is 10.5V.

When at step S104 it is judged that the voltage BV of the battery 90 is less than the predetermined voltage Vr, the present control routine proceeds to step S105. At step S105, the heater control part 80b sets the target temperature TT of the sensor cell 51 to the first temperature T1. The first temperature T1 is a temperature lower than the operating temperature of the sensor cell 51 and at least the lowest temperature at which the Leidenfrost phenomenon occurs at the outside surface of the protective layer 60 and, for example, is 400° C. After step S105, the present control routine is ended.

On the other hand, when at step S104 it is judged that the voltage BV of the battery 90 is a predetermined voltage Vr or more, the present control routine proceeds to step S106. At step S106, the heater control part 80b sets the target temperature TT of the sensor cell 51 to the second temperature T2. The second temperature T2 is a temperature of the operating temperature of the sensor cell 51 or more and, for example, is 750° C. After step S106, the present control routine is ended.

Note that, in the present embodiment, when the temperature Ts of the sensor cell 51 reaches the third temperature T3, the target temperature TT is switched from the third temperature T3 to the first temperature T1, but the target temperature TT may also be switched from the third temperature T3 to the first temperature T1 after the temperature Ts of the sensor cell 51 is maintained at the third temperature T3 for a predetermined time. Further, at step S102, the heater control part 80b may supply the heater 55 with a smaller electric power than the electric power supplied to the heater 55 when the target temperature is set to the first temperature, without setting the target temperature TT to the third temperature T3. For example, the heater control part 80b makes the current carrying duty ratio of the heater 55 lower than the current carrying duty ratio when the target temperature is set to the first temperature. In this case, at step S101, the heater control part 80b may judge whether the elapsed time from when the internal combustion engine 1 is started is less than a predetermined time.

Second Embodiment

The configuration and control of the control device of an exhaust sensor according to the second embodiment are basically similar to the control device of an exhaust sensor according to the first embodiment except for the points explained below. For this reason, below, the second embodiment of the present invention will be explained focusing on the parts different from the first embodiment.

Figure 8:
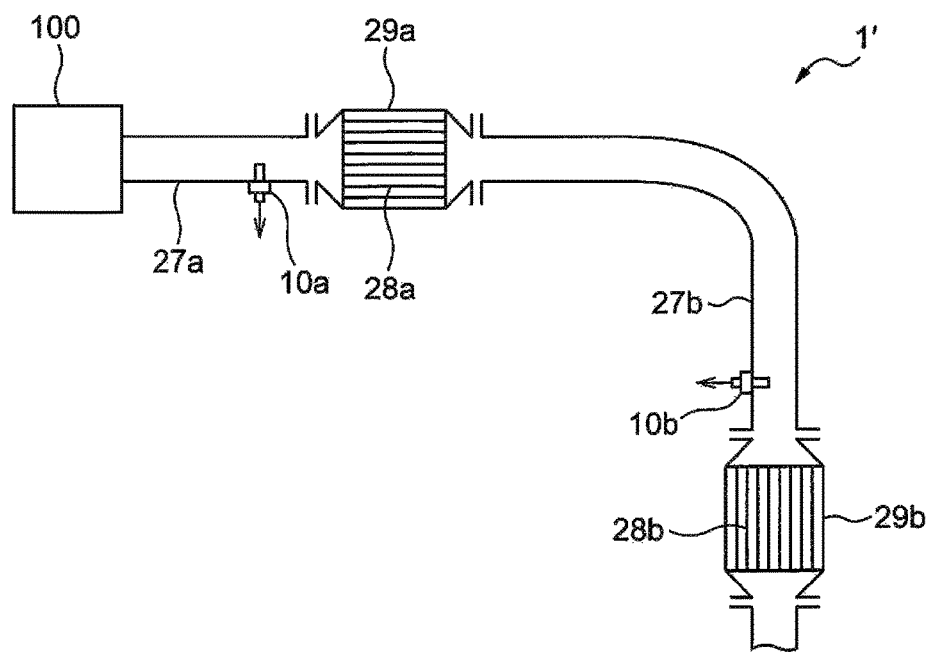
FIG. 8 is a view schematically showing an internal combustion engine in which a control device of an exhaust sensor according to a second embodiment of the present invention is used.

FIG. 8 is a view schematically showing an internal combustion engine 1' in which a control device of an exhaust sensor according to the second embodiment of the present invention is used. The internal combustion engine 1' is provided with two air-fuel ratio sensors 10a, 10b and two exhaust purification catalysts 28a, 28b. The first exhaust pipe 27a connects the engine body 100 and the upstream side casing 29a. The second exhaust pipe 27b connects the upstream side casing 29a and the downstream side casing 29b. The upstream side casing 29a houses an upstream side exhaust purification catalyst 28a. The downstream side casing 29b houses a downstream side exhaust purification catalyst 28b.

The upstream side air-fuel ratio sensor 10a is arranged in the first exhaust pipe 27a at the upstream side from the upstream side exhaust purification catalyst 28a in the direction of flow of exhaust gas, while the downstream side air-fuel ratio sensor 10b is arranged in the second exhaust pipe 27b at the downstream side from the upstream side exhaust purification catalyst 28a in the direction of flow of exhaust gas. Therefore, the upstream side air-fuel ratio sensor 10a is arranged at the upstream most side in the direction of flow of exhaust gas, while the downstream side air-fuel ratio sensor 10b is arranged at the downstream side of the upstream side air-fuel ratio sensor 10a in the direction of flow of exhaust gas. For example, the upstream side air-fuel ratio sensor 10a is arranged in the engine compartment of the vehicle in which the internal combustion engine 1' is mounted, while the downstream side air-fuel ratio sensor 10b is arranged below the floor of the vehicle in which the internal combustion engine 1' is mounted.

The second exhaust pipe 27b is separated from the combustion chambers 2 more than the first exhaust pipe 27a, so the time period from when the internal combustion engine 1' starts up to when the condensed water is produced becomes longer in the second exhaust pipe 27b than the first exhaust pipe 27a. For this reason, in the downstream side air-fuel ratio sensor 10b arranged in the second exhaust pipe 27b, even if starting heating of the sensor cell 51 and protective layer 60 after the voltage of the battery 90 recovers, there is an extremely low possibility of the sensor element 12 cracking due to coverage by water before the Leidenfrost phenomenon occurs at the surface of the protective layer 60.

Therefore, in the present embodiment, the heater control part 80b stops the supply of electric power to the heater 55 of the downstream side air-fuel ratio sensor 10b after the startup of the internal combustion engine 1' until the voltage of the battery 90 detected by the battery voltage detection part 80a recovers to the predetermined voltage. Further, the heater control part 80b sets the target temperature of the sensor cell 51 at the downstream side air-fuel ratio sensor 10b to the third temperature when the voltage of the battery 90 detected by the battery voltage detection part 80a recovers to the predetermined voltage. The third temperature is a temperature of the boiling point of water to less than the first temperature and, for example, is 120° C. Furthermore, the heater control part 80b switches the target temperature of the sensor cell 51 at the downstream side air-fuel ratio sensor 10b from the third temperature to the second temperature when the temperature of the sensor cell 51 reaches the third temperature. The second temperature is a temperature of the operating temperature of the sensor cell 51 or more and, for example, is 750° C.

On the other hand, the heater control part 80b sets the target temperature of the sensor cell 51 at the upstream side air-fuel ratio sensor 10a to the first temperature after startup of the internal combustion engine 1' until the voltage of the battery 90 detected by the battery voltage detection part 80a recovers to the predetermined voltage. The first temperature is a temperature of less than the operating temperature of the sensor cell 51 and at least the lowest temperature at which the Leidenfrost phenomenon occurs at the outside surface of the protective layer 60 and, for example, is 400° C.

By performing the above-mentioned control in the present embodiment, when the internal combustion engine has a plurality of air-fuel ratio sensors, it is possible to prevent cracking of the element of the air-fuel ratio sensor due to coverage by water while more effectively suppressing an increase in the power consumption of the heater.

Note that, the heater control part 80b may set the target temperature of the sensor cell 51 at the downstream side air-fuel ratio sensor 10b to a temperature of less than the lowest temperature at which the Leidenfrost phenomenon occurs after startup of the internal combustion engine 1' until the voltage of the battery 90 detected by the battery voltage detection part 80a recovers to the predetermined voltage. For example, the heater control part 80b may set the target temperature of the sensor cell 51 at the downstream side air-fuel ratio sensor 10b to the third temperature after startup of the internal combustion engine 1' until the voltage of the battery 90 detected by the battery voltage detection part 80a recovers to the predetermined voltage. In this case, the heater control part 80b switches the target temperature of the sensor cell 51 at the downstream side air-fuel ratio sensor 10b from the third temperature to the second temperature when the voltage of the battery 90 detected by the battery voltage detection part 80a recovers to the predetermined voltage.

<Explanation of Control Using Time Chart>

Figure 9:
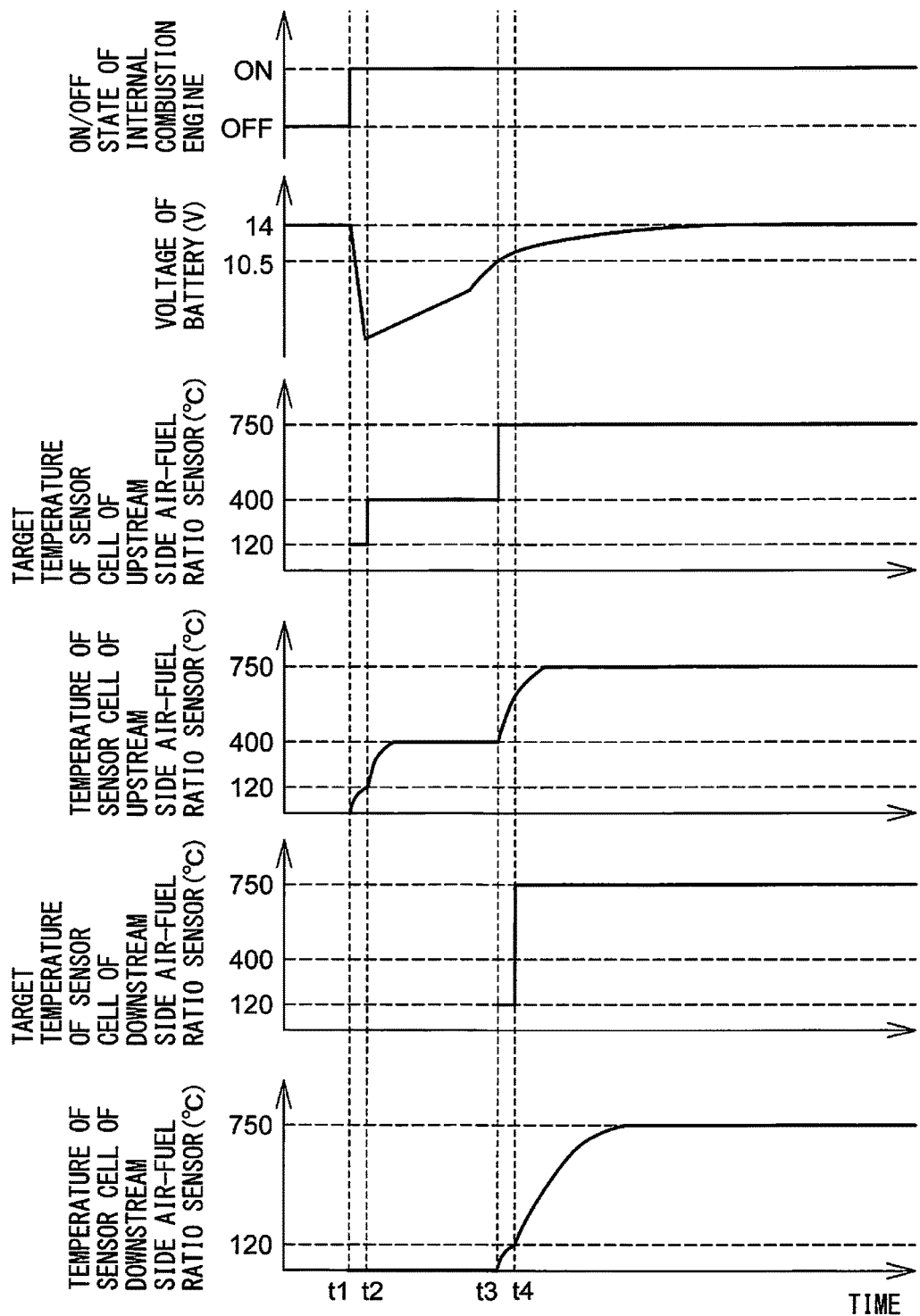
FIG. 9 is a schematic time chart of an on/off state of an internal combustion engine etc. when starting up the internal combustion engine.

Below, referring to the time chart of FIG. 9, the control when starting up the internal combustion engine 1' will be specifically explained. FIG. 9 is a schematic time chart of the on/off state of internal combustion engine 1', voltage of the battery 90, target temperature of the sensor cell 51 of the upstream side air-fuel ratio sensor 10a, temperature of the sensor cell 51 of the upstream side air-fuel ratio sensor 10a, target temperature of the sensor cell 51 of the downstream side air-fuel ratio sensor 10b, and temperature of the sensor cell 51 of the downstream side air-fuel ratio sensor 10b when making an internal combustion engine 1' start up.

In the illustrated example, at the time t1, if the internal combustion engine 1' is started up, the target temperature of the sensor cell 51 of the upstream side air-fuel ratio sensor 10a is set to 120° C. As a result, the temperature of the sensor cell 51 of the upstream side air-fuel ratio sensor 10a rises toward 120° C. At the time t2, if the temperature of the sensor cell 51 reaches 120° C., the target temperature of the sensor cell 51 is switched from 120° C. to 400° C. As a result, the temperature of the sensor cell 51 rises toward 400° C. After the temperature of the sensor cell 51 reaches 400° C., the temperature of the sensor cell 51 is maintained at 400° C. until the voltage of the battery 90 recovers.

On the other hand, even after the internal combustion engine 1' is started up, the heater 55 of the downstream side air-fuel ratio sensor 10b remains turned off. The heater 55 of the downstream side air-fuel ratio sensor 10b is turned off until the voltage of the battery 90 recovers.

At the time t3, the voltage of the battery 90 recovers to 10.5V. For this reason, at the time t3, the target temperature of the sensor cell 51 of the upstream side air-fuel ratio sensor 10a is switched from 400° C. to 750° C. As a result, the temperature of the sensor cell 51 of the upstream side air-fuel ratio sensor 10a rises toward 750° C. After the temperature of the sensor cell 51 of the upstream side air-fuel ratio sensor 10a reaches 750° C., the temperature of the sensor cell 51 of the upstream side air-fuel ratio sensor 10a is maintained at 750° C.

On the other hand, at the time t3, the target temperature of the sensor cell 51 of the downstream side air-fuel ratio sensor 10b is set to 120° C. As a result, the temperature of the sensor cell 51 of the downstream side air-fuel ratio sensor 10b rises toward 120° C. At the time t4, if the temperature of the sensor cell 51 of the downstream side air-fuel ratio sensor 10b reaches 120° C., the target temperature of the sensor cell 51 of the downstream side air-fuel ratio sensor 10b is switched from 120° C. to 750° C. As a result, the temperature of the sensor cell 51 of the downstream side air-fuel ratio sensor 10b rises toward 750° C. After the temperature of the sensor cell 51 of the downstream side air-fuel ratio sensor 10b reaches 750° C., the temperature of the sensor cell 51 of the downstream side air-fuel ratio sensor 10b is maintained at 750° C.

<Processing for Setting Target Temperature>

Figure 10:
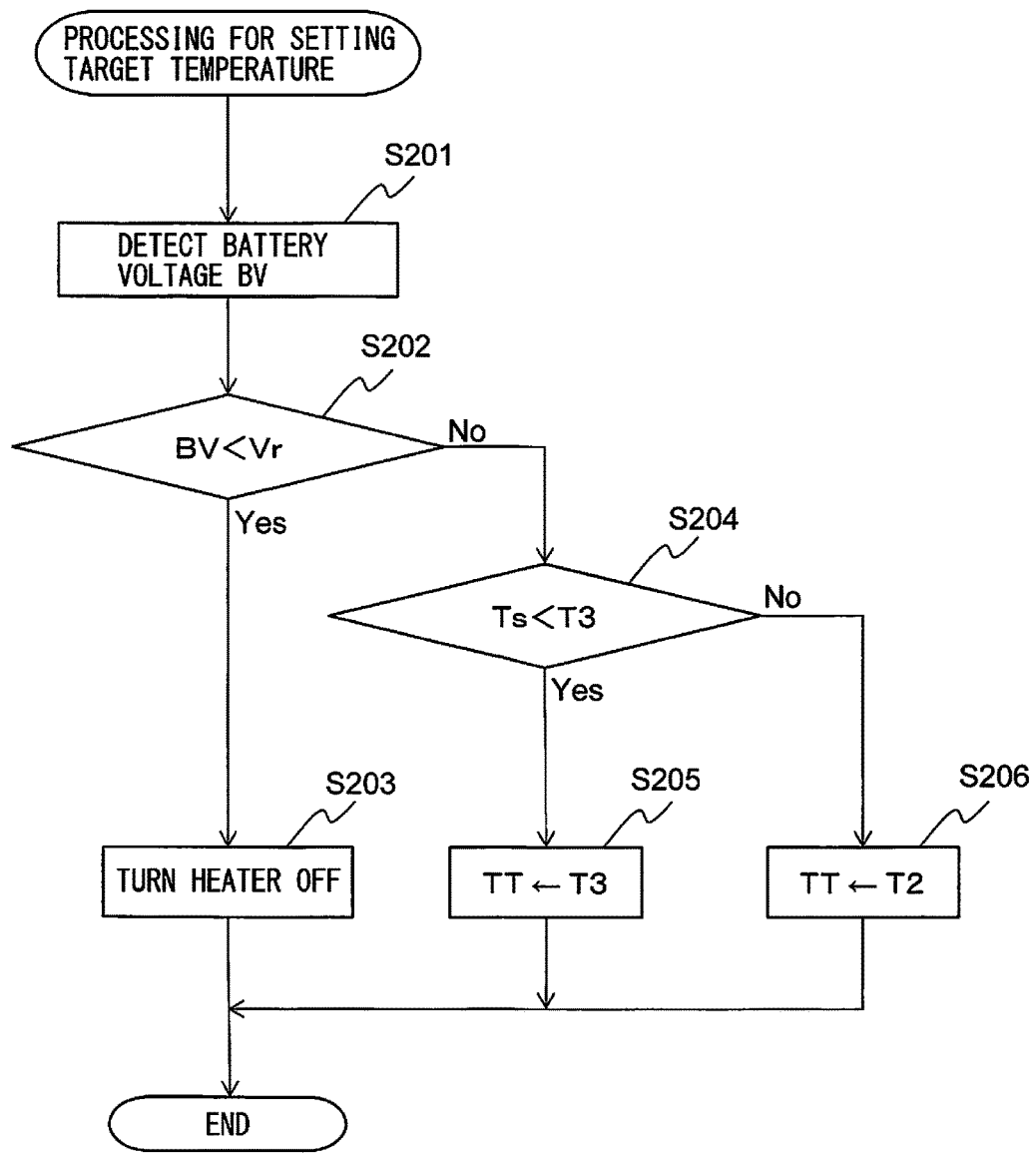
FIG. 10 is a flow chart showing a control routine for processing for setting the target temperature in the second embodiment of the present invention.

For the upstream side air-fuel ratio sensor 10a, the control routine shown in FIG. 7 is performed to set the target temperature of the sensor cell 51. On the other hand, for the downstream side air-fuel ratio sensor 10b, the control routine shown in FIG. 10 is performed to set the target temperature of the sensor cell 51. FIG. 10 is a flow chart showing a control routine for the processing for setting the target temperature in the second embodiment of the present invention. The present control routine is repeatedly performed after startup of the internal combustion engine 1' by the ECU 80 at predetermined time intervals.

First, at step S201, the battery voltage detection part 80a detects the voltage BV of the battery 90. Next, at step S202, the heater control part 80b judges whether the voltage BV of the battery 90 is less than a predetermined voltage Vr. The predetermined voltage Vr is a voltage less than the rated voltage of the battery 90 and, for example, is 10.5V.

When at step S202 it is judged that the voltage BV of the battery 90 is less than the predetermined voltage Vr, the present control routine proceeds to step S203. At step S203, the heater 55 is turned off. That is, the supply of electric power from the battery 90 to the heater 55 is stopped. After step S203, the present control routine is ended.

On the other hand, when at step S203 it is judged that the voltage BV of the battery 90 is the predetermined voltage Vr or more, the present control routine proceeds to step S204. At step S204, the heater control part 80b judges whether the temperature Ts of the sensor cell 51 is less than the third temperature T3. The temperature Ts of the sensor cell 51 is calculated based on the impedance of the sensor cell 51. The third temperature T3 is a temperature from the boiling point of water to less than the first temperature T1 and, for example, is 120° C.

When at step S204 it is judged that the temperature Ts of the sensor cell 51 is less than the third temperature T3, the present control routine proceeds to step S205. At step S205, the heater control part 80b sets the target temperature TT of the sensor cell 51 to the third temperature T3. The third temperature T3 is a temperature from the boiling point of water to less than the first temperature T1 and, for example, is 120° C. After step S205, the present control routine is ended.

On the other hand, when at step S204 it is judged that the temperature Ts of the sensor cell 51 is the third temperature T3 or more, the present control routine proceeds to step S206. At step S206, the heater control part 80b sets the target temperature TT of the sensor cell 51 to the second temperature T2. The second temperature T2 is a temperature of the operating temperature of the sensor cell 51 or more and, for example, is 750° C. After step S206, the present control routine is ended.

Note that, at step S203, the heater control part 80b may set the target temperature TT of the sensor cell 51 to the third temperature T3. Further, the internal combustion engine 1' may be provided with three or more exhaust sensors. In this case, the control routine shown in FIG. 7 is performed for the exhaust sensor arranged at the upstream most side, while the control routine shown in FIG. 10 is performed for the other exhaust sensors.

Third Embodiment

The configuration and control of the control device of an exhaust sensor according to the third embodiment are basically similar to the control device of an exhaust sensor according to the first embodiment except for the points explained below. For this reason, below, the third embodiment of the present invention will be explained focusing on the parts different from the first embodiment.

Figure 11:
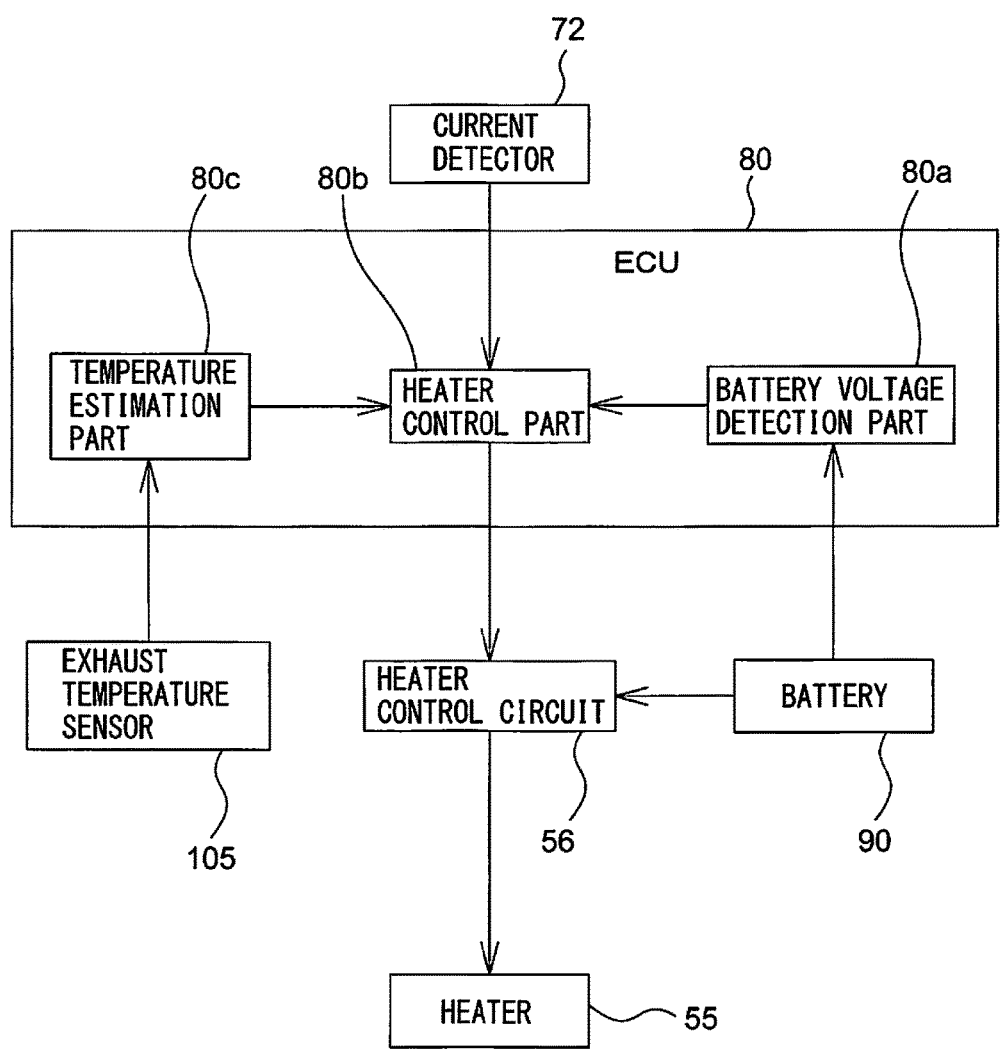
FIG. 11 is a block diagram schematically showing the configuration of a control device of an exhaust sensor etc. according to a third embodiment of the present invention.

FIG. 11 is a block diagram schematically showing the configuration of the control device of an exhaust sensor etc. according to the third embodiment of the present invention etc. The control device of an exhaust sensor is further provided with a temperature estimation part 80c. In the present embodiment, the temperature estimation part 80c is part of the ECU 80.

Figure 12:
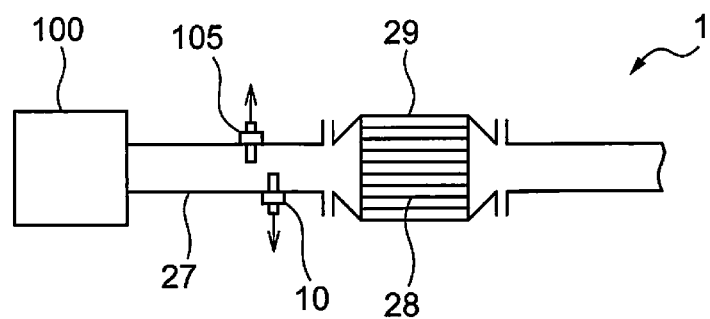
FIG. 12 is a view schematically showing an internal combustion engine in which a control device of an exhaust sensor according to the third embodiment of the present invention is used.

The temperature estimation part estimates the temperature of the exhaust pipe 27 around the air-fuel ratio sensor 10 (below, simply referred to as the "temperature of the exhaust pipe 27"). For example, the temperature estimation part estimates the temperature of the exhaust pipe 27 from the output of the exhaust temperature sensor 105 arranged in the exhaust passage near the air-fuel ratio sensor 10. In the present embodiment, as shown in FIG. 12, the exhaust temperature sensor 105 is arranged near the air-fuel ratio sensor 10 and detects the temperature of the exhaust pipe 27. The output of the exhaust temperature sensor 105 is input to the input port 85 of the ECU 80 through the corresponding AD converter 87.

Note that, the temperature estimation part 80c may estimate the temperature of the exhaust pipe 27 without using the exhaust temperature sensor 105. In this case, in the internal combustion engine 1, it is not necessary to provide the exhaust temperature sensor 105 near the air-fuel ratio sensor 10. For example, the temperature estimation part 80c may estimate the temperature of the exhaust pipe 27 based on the elapsed time from when the internal combustion engine 1 is started up. In this case, the longer the elapsed time from when the internal combustion engine 1 is started up, the higher the temperature of the exhaust pipe 27 estimated by the temperature estimation part 80c is made.

Figure 13:
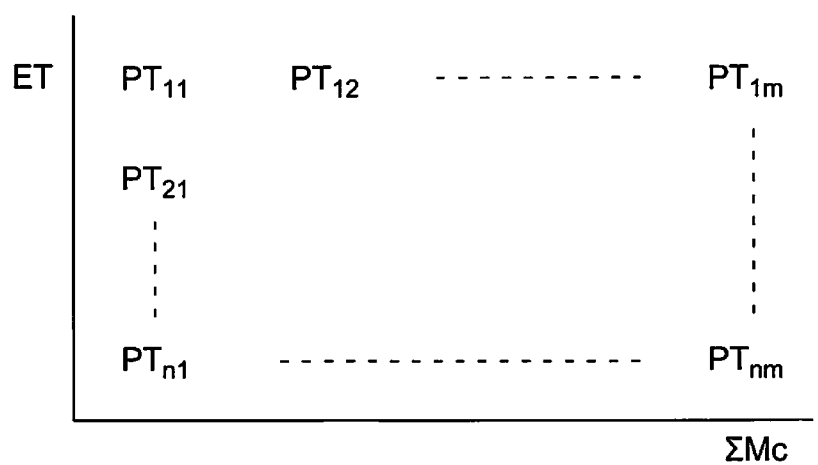
FIG. 13 is a graph showing the relationship between an elapsed time and cumulative amount of air, and temperature of an exhaust pipe.

Further, the temperature estimation part 80c may estimate the temperature of the exhaust pipe 27 based on the cumulative value of the amount of intake air supplied to the combustion chamber 2 from when the internal combustion engine 1 is started up (below, referred to as "cumulative amount of air"). The cumulative amount of air is for example calculated based on the output of the air-flow meter 102. In this case, the greater the cumulative amount of air, the higher the temperature of the exhaust pipe 27 estimated by the temperature estimation part 80c. Further, the temperature estimation part 80c may estimate the temperature of the exhaust pipe 27 based on the elapsed time from when the internal combustion engine 1 starts up and the cumulative amount of air. In this case, the temperature estimation part 80c, for example, uses a map such as shown in FIG. 13 to estimate the temperature of the exhaust pipe 27. In this map, the temperature PT of the exhaust pipe 27 is shown as a function of the elapsed time ET and cumulative amount of air ΣMc.

After the voltage of the battery 90 recovers, a large amount of condensed water is formed inside the exhaust pipe 27, but if the temperature of the exhaust pipe 27 reaches the boiling point of water, the formed condensed water evaporates. Further, as will be understood from FIG. 4, the greater the amount of drops of water striking the protective layer 60, the more necessary it is to make the temperature of the protective layer 60 higher in temperature so as to cause the Leidenfrost phenomenon. For this reason, until the temperature of the exhaust pipe 27 reaches the boiling point of water, the target temperature of the sensor cell 51 is preferably made higher than the operating temperature.

Therefore, in the third embodiment, the heater control part 80b switches the target temperature of the sensor cell 51 from a second temperature to a fourth temperature when the temperature of the exhaust pipe 27 estimated by the temperature estimation part 80c reaches a temperature of the boiling point of water or more after the voltage of the battery 90 detected by the battery voltage detection part 80a recovers to the predetermined voltage. The boiling point of water is 100° C. at atmospheric pressure (1 atm). The second temperature is a temperature higher than the operating temperature of the sensor cell 51 and, for example, is 800° C. The fourth temperature is the operating temperature of the sensor cell 51 and, for example, is 750° C. Due to this control, in the third embodiment, it is possible to more reliably prevent cracking of the element of the air-fuel ratio sensor 10 due to coverage by water.

<Explanation of Control Using Time Chart>

Figure 14:
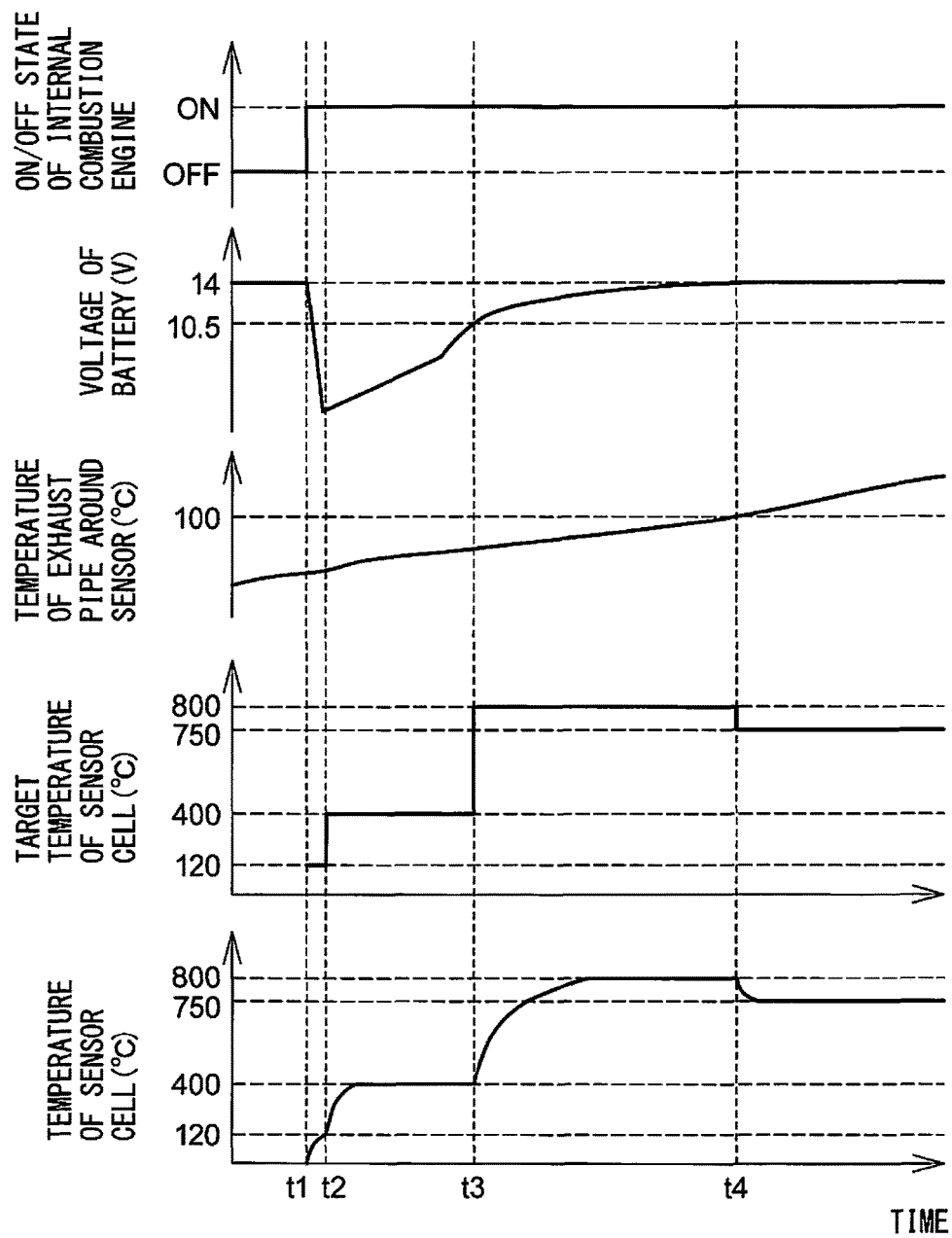
FIG. 14 is a schematic time chart of an on/off state of an internal combustion engine etc. when starting up the internal combustion engine.

Below, referring to the time chart of FIG. 14, the control when making the internal combustion engine 1 start up will be specifically explained. FIG. 14 is a schematic time chart of the on/off state of internal combustion engine 1, voltage of the battery 90, temperature of the exhaust pipe 27, target temperature of the sensor cell 51, and temperature of the sensor cell 51 when making an internal combustion engine 1 start up. In the illustrated example, the temperature of the exhaust pipe 27 is calculated from the output of the exhaust temperature sensor 105. Further, the temperature of the sensor cell 51 is calculated based on the impedance of the sensor cell 51.

In the illustrated example, at the time t1, if the internal combustion engine 1 is started, the target temperature of the sensor cell 51 is set to 120° C. As a result, the temperature of the sensor cell 51 rises toward 120° C. At the time t2, if the temperature of the sensor cell 51 reaches 120° C., the target temperature of the sensor cell 51 is switched from 120° C. to 400° C. As a result, the temperature of the sensor cell 51 rises toward 400° C. After the temperature of the sensor cell 51 reaches 400° C., the temperature of the sensor cell 51 is maintained at 400° C. until the voltage of the battery 90 recovers.

At the time t3, the voltage of the battery 90 recovers to 10.5V. For this reason, at the time t3, the target temperature of the sensor cell 51 is switched from 400° C. to 800° C. As a result, the temperature of the sensor cell 51 rises toward 800° C. After the temperature of the sensor cell 51 reaches 800° C., the temperature of the sensor cell 51 is maintained at 800° C. until the temperature of the exhaust pipe 27 reaches the boiling point of water (100° C.)

At the time t4, the temperature of the exhaust pipe 27 reaches 100° C. For this reason, at the time t4, the target temperature of the sensor cell 51 is switched from 800° C. to 750° C. As a result, the temperature of the sensor cell 51 falls toward 750° C. After the temperature of the sensor cell 51 reaches 750° C., the temperature of the sensor cell 51 is maintained at 750° C.

<Processing for Setting Target Temperature>

Figure 15:
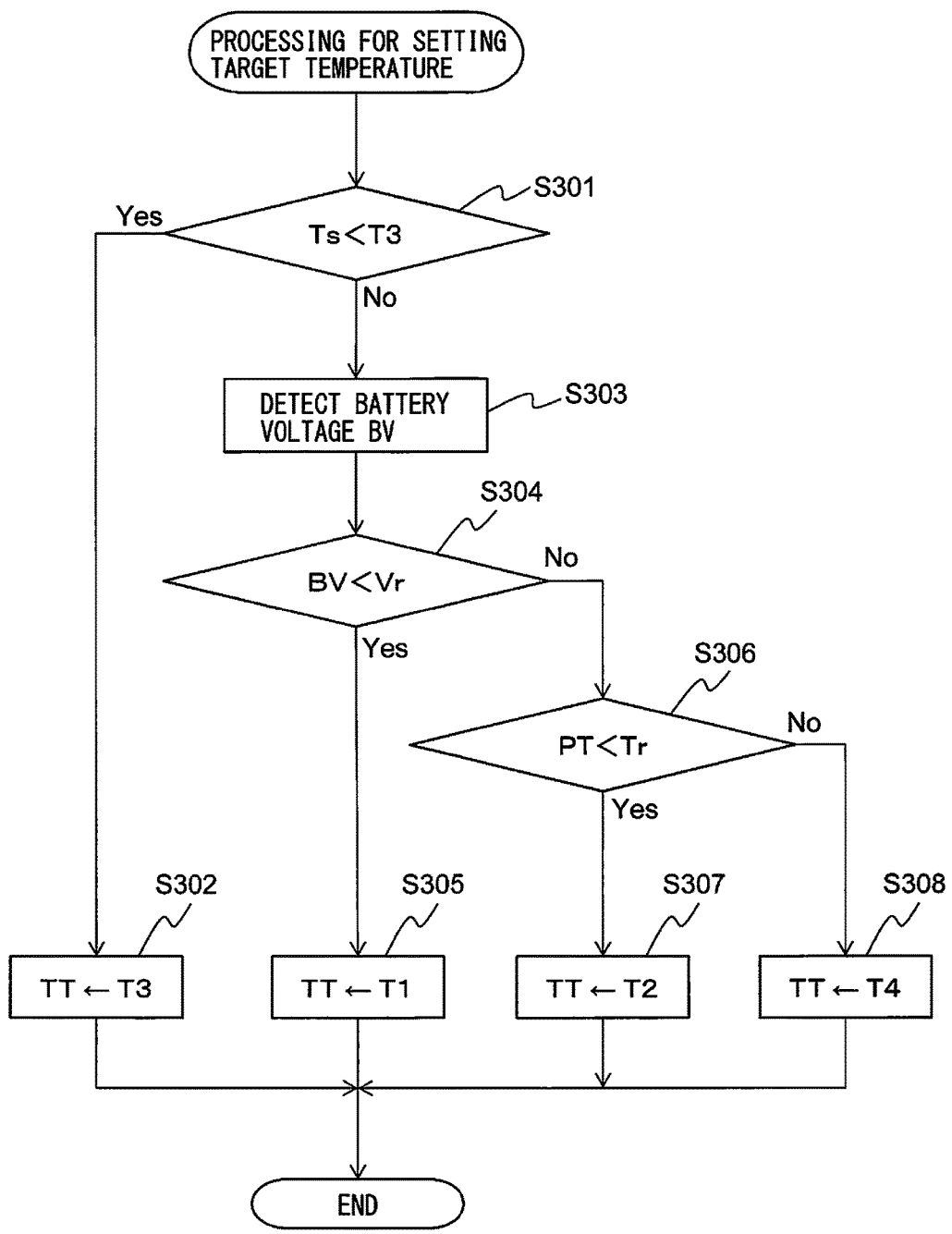
FIG. 15 is a flow chart showing a control routine for processing for setting the target temperature in the third embodiment of the present invention.

FIG. 15 is a flow chart showing a control routine for the processing for setting a target temperature in the third embodiment of the present invention. The present control routine is repeatedly performed after startup of the internal combustion engine 1 by the ECU 80 at predetermined time intervals. Step S301 to step S305 in FIG. 15 are similar to step S101 to step S105 in FIG. 7, so explanations will be omitted.

When at step S304 it is judged that the voltage BV of the battery 90 is the predetermined voltage Vr or more, the present control routine proceeds to step S306. At step S306, the heater control part 80b judges whether the temperature PT of the exhaust pipe 27 is less than the reference temperature Tr. The reference temperature Tr is the temperature of the boiling point of water or more, for example, the boiling point of water. The temperature PT of the exhaust pipe 27 is estimated by the temperature estimation part 80c using any of the above-mentioned methods.

When at step S306 it is judged that the temperature PT of the exhaust pipe 27 is less than the reference temperature Tr, the present control routine proceeds to step S307. At step S307, the heater control part 80b sets the target temperature TT of the sensor cell 51 to a second temperature T2. The second temperature T2 is a temperature higher than the operating temperature of the sensor cell 51 and, for example, is 800° C. After step S307, the present control routine is ended.

On the other hand, when at step S306 it is judged that the temperature PT of the exhaust pipe 27 is the reference temperature Tr or more, the present control routine proceeds to step S3088. At step S308, the heater control part 80b sets the target temperature TT of the sensor cell 51 to a fourth temperature T4. The fourth temperature T4 is the operating temperature of the sensor cell 51 and, for example, is 750° C. After step S308, the present control routine is ended.

Above, preferred embodiments according to the present invention were explained, but the present invention is not limited to these embodiments. Various corrections and changes may be made within the language of the claims. For example, the exhaust sensor controlled by the control device of the exhaust sensor may be an oxygen sensor which detects the oxygen in the exhaust gas so as to detect if the air-fuel ratio of the exhaust gas is rich or lean. Further, the exhaust sensor may be a nitrogen oxide sensor ($NO_X$ sensor) detecting the concentration of nitrogen oxides ($NO_X$) in the exhaust gas, a sulfur oxide sensor ($SO_X$ sensor) detecting the concentration of sulfur oxides ($SO_X$) in the exhaust gas, etc.

Further, the heater control part may set the target temperature of the sensor cell to a first temperature until the voltage of the battery detected by the battery voltage detection part recovers to the predetermined voltage without setting the target temperature of the sensor cell to a third temperature after the startup of the internal combustion engine.

Further, the element body of the exhaust sensor may be provided with another electrochemical cell in addition to the sensor cell. The other electrochemical cell is, for example, a pump cell discharging the oxygen in the measured gas from the measured gas chamber, a monitor cell detecting the concentration of a specific component in the measured gas, etc. In this case, the heater control part may set the target temperature of the pump cell or monitor cell and may control the heater so that the temperature of the pump cell or monitor cell becomes the target temperature. The temperature of the pump cell or monitor cell is calculated by its impedance.

Further, the above-mentioned embodiments can be freely combined and carried out. For example, instead of step S206 of FIG. 10, step S306 to step S308 of FIG. 15 may be performed.

The invention claimed is:

1. A control device of an exhaust sensor controlling an exhaust sensor arranged in an exhaust passage in an internal combustion engine and detecting a specific component in exhaust gas, wherein the exhaust sensor comprises an element body provided with an electrochemical cell, a protective layer formed on an outer surface of the element body and comprised of a porous ceramic, and a heater supplied with electric power from a battery and heating the element body and the protective layer, the control device comprises a battery voltage detection part configured to detect a voltage of the battery, and a heater control part configured to set a target temperature of the electrochemical cell and control the electric power supplied from the battery to the heater so that the temperature of the electrochemical cell becomes the target temperature, and the heater control part is configured to set the target temperature to a first temperature after startup of the internal combustion engine until the voltage of the battery detected by the battery voltage detection part recovers to a predetermined voltage, and switch the target temperature from the first temperature to a second temperature when the voltage of the battery detected by the battery voltage detection part recovers to the predetermined voltage, the first temperature being a temperature lower than an operating temperature of the electrochemical cell and at least a lowest temperature at which a Leidenfrost phenomenon occurs at an outer surface of the protective layer, and the second temperature being a temperature of the operating temperature or more.

2. The control device of an exhaust sensor according to claim 1, wherein the heater control part is configured to supply the heater with electric power smaller than an electric power supplied to the heater when the target temperature is set to the first temperature, after startup of the internal combustion engine and before setting the target temperature to the first temperature.

3. The control device of an exhaust sensor according to claim 2, wherein the heater control part is configured to set the target temperature to a third temperature after startup of the internal combustion engine and before setting the target temperature to the first temperature, the third temperature being a temperature of a boiling point of water to less than the first temperature.

4. The control device of an exhaust sensor according to claim 3, wherein the exhaust sensor includes an upstream side exhaust sensor arranged at an upstream most side in a direction of flow of exhaust gas and a downstream side exhaust sensor arranged at a downstream side of the upstream side exhaust sensor in the direction of flow of exhaust gas, and the heater control part is configured to set the target temperature at the upstream side exhaust sensor to the first temperature and set the target temperature at the downstream side exhaust sensor to a temperature of less than the lowest temperature or stop the supply of power to the heater of the downstream side exhaust sensor after startup of the internal combustion engine until the voltage of the battery detected by the battery voltage detection part recovers to the predetermined voltage.

5. The control device of an exhaust sensor according to claim 4, further comprising a temperature estimation part configured to estimate a temperature of an exhaust pipe around the exhaust sensor, wherein the heater control part is configured to switch the target temperature from the second temperature to a fourth temperature when the temperature of the exhaust pipe estimated by the temperature estimation part reaches a temperature of the boiling point of water or more after the voltage of the battery detected by the battery voltage detection part recovers to the predetermined voltage, the second temperature being a temperature higher than the operating temperature, the fourth temperature being the operating temperature.

6. The control device of an exhaust sensor according to claim 3, further comprising a temperature estimation part configured to estimate a temperature of an exhaust pipe around the exhaust sensor, wherein the heater control part is configured to switch the target temperature from the second temperature to a fourth temperature when the temperature of the exhaust pipe estimated by the temperature estimation part reaches a temperature of the boiling point of water or more after the voltage of the battery detected by the battery voltage detection part recovers to the predetermined voltage, the second temperature being a temperature higher than the operating temperature, the fourth temperature being the operating temperature.

7. The control device of an exhaust sensor according to claim 2, wherein the exhaust sensor includes an upstream side exhaust sensor arranged at an upstream most side in a direction of flow of exhaust gas and a downstream side exhaust sensor arranged at a downstream side of the upstream side exhaust sensor in the direction of flow of exhaust gas, and the heater control part is configured to set the target temperature at the upstream side exhaust sensor to the first temperature and set the target temperature at the downstream side exhaust sensor to a temperature of less than the lowest temperature or stop the supply of power to the heater of the downstream side exhaust sensor after startup of the internal combustion engine until the voltage of the battery detected by the battery voltage detection part recovers to the predetermined voltage.

8. The control device of an exhaust sensor according to claim 7, further comprising a temperature estimation part configured to estimate a temperature of an exhaust pipe around the exhaust sensor, wherein the heater control part is configured to switch the target temperature from the second temperature to a fourth temperature when the temperature of the exhaust pipe estimated by the temperature estimation part reaches a temperature of the boiling point of water or more after the voltage of the battery detected by the battery voltage detection part recovers to the predetermined voltage, the second temperature being a temperature higher than the operating temperature, the fourth temperature being the operating temperature.

9. The control device of an exhaust sensor according to claim 2, further comprising a temperature estimation part configured to estimate a temperature of an exhaust pipe around the exhaust sensor, wherein the heater control part is configured to switch the target temperature from the second temperature to a fourth temperature when the temperature of the exhaust pipe estimated by the temperature estimation part reaches a temperature of the boiling point of water or more after the voltage of the battery detected by the battery voltage detection part recovers to the predetermined voltage, the second temperature being a temperature higher than the operating temperature, the fourth temperature being the operating temperature.

10. The control device of an exhaust sensor according to claim 1, wherein the exhaust sensor includes an upstream side exhaust sensor arranged at an upstream most side in a direction of flow of exhaust gas and a downstream side exhaust sensor arranged at a downstream side of the upstream side exhaust sensor in the direction of flow of exhaust gas, and the heater control part is configured to set the target temperature at the upstream side exhaust sensor to the first temperature and set the target temperature at the downstream side exhaust sensor to a temperature of less than the lowest temperature or stop the supply of power to the heater of the downstream side exhaust sensor after startup of the internal combustion engine until the voltage of the battery detected by the battery voltage detection part recovers to the predetermined voltage.

11. The control device of an exhaust sensor according to claim 10, further comprising a temperature estimation part configured to estimate a temperature of an exhaust pipe around the exhaust sensor, wherein the heater control part is configured to switch the target temperature from the second temperature to a fourth temperature when the temperature of the exhaust pipe estimated by the temperature estimation part reaches a temperature of the boiling point of water or more after the voltage of the battery detected by the battery voltage detection part recovers to the predetermined voltage, the second temperature being a temperature higher than the operating temperature, the fourth temperature being the operating temperature.

12. The control device of an exhaust sensor according to claim 1, further comprising a temperature estimation part configured to estimate a temperature of an exhaust pipe around the exhaust sensor, wherein the heater control part is configured to switch the target temperature from the second temperature to a fourth temperature when the temperature of the exhaust pipe estimated by the temperature estimation part reaches a temperature of the boiling point of water or more after the voltage of the battery detected by the battery voltage detection part recovers to the predetermined voltage, the second temperature being a temperature higher than the operating temperature, the fourth temperature being the operating temperature.

* * * * *